United States Patent
Laugwitz

(10) Patent No.: US 10,704,211 B2
(45) Date of Patent: Jul. 7, 2020

(54) MEASURING PAVING LAYER THICKNESS BY MEANS OF A ROAD ROLLER

(71) Applicant: BOMAG GMBH, Boppard (DE)

(72) Inventor: Niels Laugwitz, Lahnstein (DE)

(73) Assignee: BOMAG GMBH, Boppard (DE)

( * ) Notice: Subject to any disclaimer, the term of this patent is extended or adjusted under 35 U.S.C. 154(b) by 0 days.

(21) Appl. No.: 16/178,686

(22) Filed: Nov. 2, 2018

(65) Prior Publication Data
US 2019/0136467 A1 May 9, 2019

(30) Foreign Application Priority Data
Nov. 3, 2017 (DE) .................. 10 2017 010 238

(51) Int. Cl.
| | |
|---|---|
| *E01C 23/07* | (2006.01) |
| *E01C 19/28* | (2006.01) |
| *E01C 19/23* | (2006.01) |
| *G01B 11/06* | (2006.01) |
| *E01C 19/26* | (2006.01) |

(Continued)

(52) U.S. Cl.
CPC .............. *E01C 23/07* (2013.01); *E01C 19/23* (2013.01); *E01C 19/26* (2013.01); *E01C 19/266* (2013.01); *E01C 19/282* (2013.01); *E01C 19/288* (2013.01); *E01C 23/01* (2013.01);
(Continued)

(58) Field of Classification Search
CPC ......... E01C 23/07; E01C 19/266; E01C 19/26
See application file for complete search history.

(56) References Cited

U.S. PATENT DOCUMENTS

| | | | | |
|---|---|---|---|---|
| 4,473,319 A | * | 9/1984 | Spangler ............ | B60G 17/0165 172/4.5 |
| 5,942,679 A | * | 8/1999 | Sandstrom .............. | E01C 19/26 404/133.05 |

(Continued)

FOREIGN PATENT DOCUMENTS

| | | | | |
|---|---|---|---|---|
| DE | 3444623 | | 6/1986 | |
| DE | 3444623 A1 | * | 6/1986 | ........... G01C 15/002 |

(Continued)

OTHER PUBLICATIONS

Examination Report from corresponding German Appln. No. 10 2017 010 238.4, dated Sep. 6, 2018.

(Continued)

*Primary Examiner* — Abigail A Risic
(74) *Attorney, Agent, or Firm* — Grossman, Tucker, Perreault & Pfleger, PLLC

(57) ABSTRACT

A self-propelled road roller comprising a machine frame, a drive unit; and a control device, wherein the self-propelled road roller comprises a tandem roller or a single-drum roller, to compact ground in a working direction; and wherein a sensor device for determining the thickness of a paved layer is provided, the sensor device comprising a height reference sensor and a distance sensor, the height reference sensor being configured to determine its height position in relation to a height reference, and the distance sensor being configured to determine the height position of the height reference sensor in relation to the ground, and that the control device is configured to ascertain the thickness of the paved layer from the measurements of the sensor device and a predetermined reference height.

13 Claims, 4 Drawing Sheets

(51) Int. Cl.
 *E01C 23/01* (2006.01)
 *G01B 17/02* (2006.01)
 *G01C 15/00* (2006.01)

(52) U.S. Cl.
 CPC .......... *G01B 11/0608* (2013.01); *G01B 17/02* (2013.01); *G01C 15/004* (2013.01)

(56) References Cited

U.S. PATENT DOCUMENTS

| | | | | |
|---|---|---|---|---|
| 7,172,363 | B2* | 2/2007 | Olson | E01C 19/006 404/118 |
| 7,484,911 | B2* | 2/2009 | Frelich | E01C 19/48 222/71 |
| 9,033,611 | B2 | 5/2015 | Hanfland et al. | |
| 2010/0129152 | A1* | 5/2010 | Taylor | E01C 23/07 404/75 |
| 2011/0302998 | A1* | 12/2011 | Hanson | E01C 19/26 73/78 |
| 2013/0290062 | A1* | 10/2013 | Patel | G06Q 10/06313 705/7.23 |
| 2017/0306575 | A1* | 10/2017 | Utterodt | E01C 19/231 |

FOREIGN PATENT DOCUMENTS

| | | | |
|---|---|---|---|
| DE | 19958543 C1 * | 5/2001 | ......... G01B 11/0608 |
| DE | 10234217 | 2/2004 | |
| DE | 10356516 | 7/2005 | |
| DE | 102009044581 | 6/2010 | |
| EP | 2535458 | 12/2012 | |

OTHER PUBLICATIONS

Search Report from related EPO Appln. No. 18000810.4, dated Jan. 4, 2019.

\* cited by examiner

Fig. 1
Fig. 2
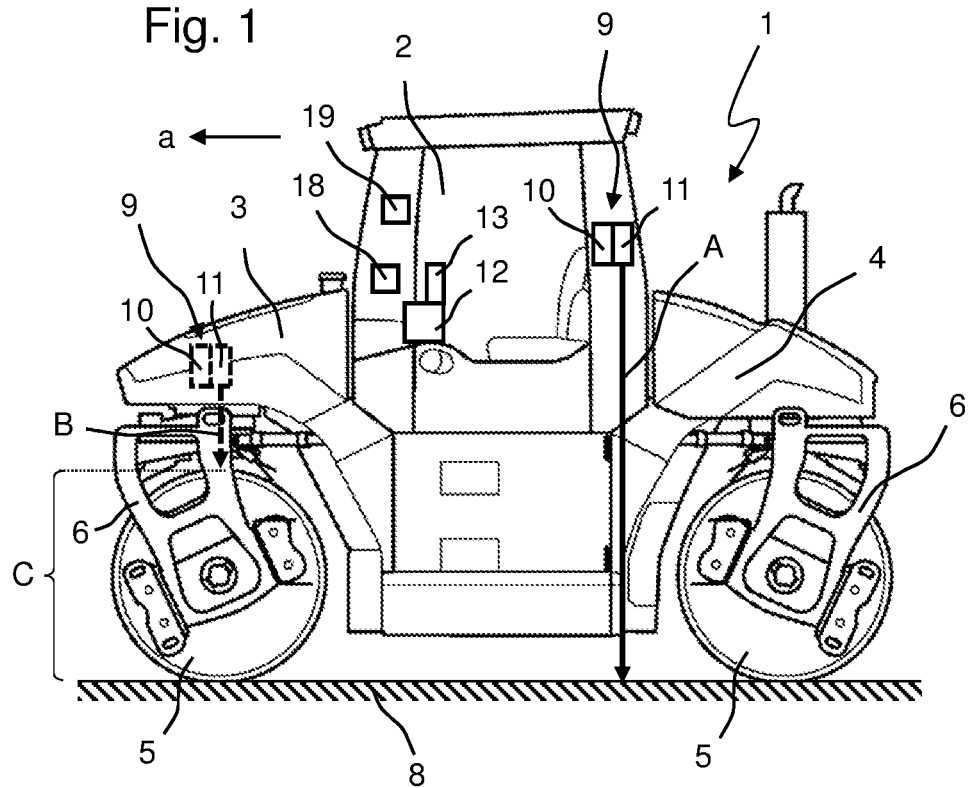
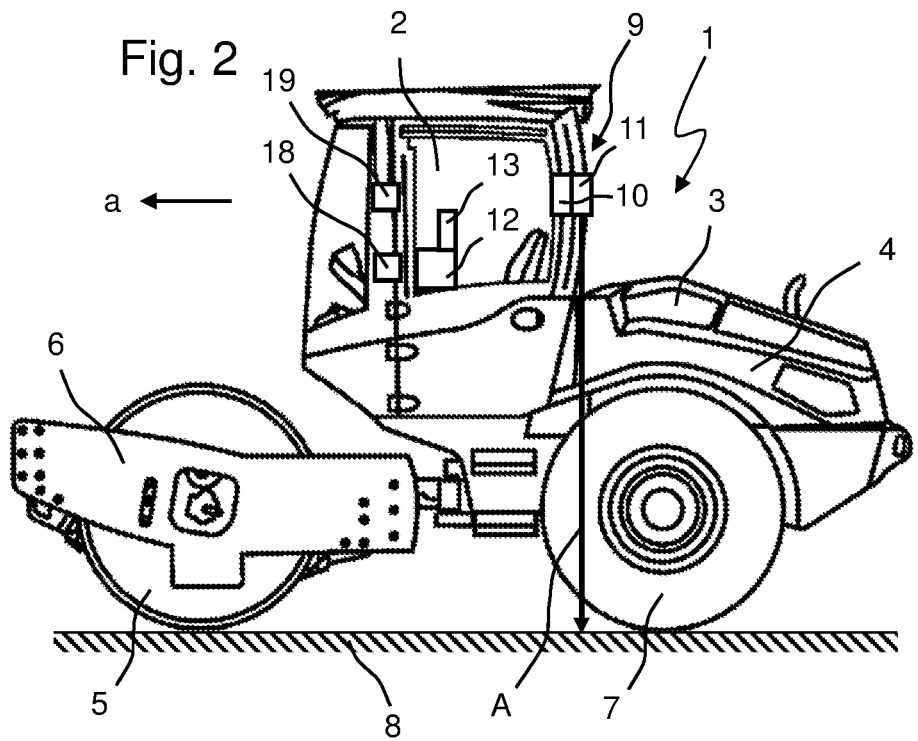

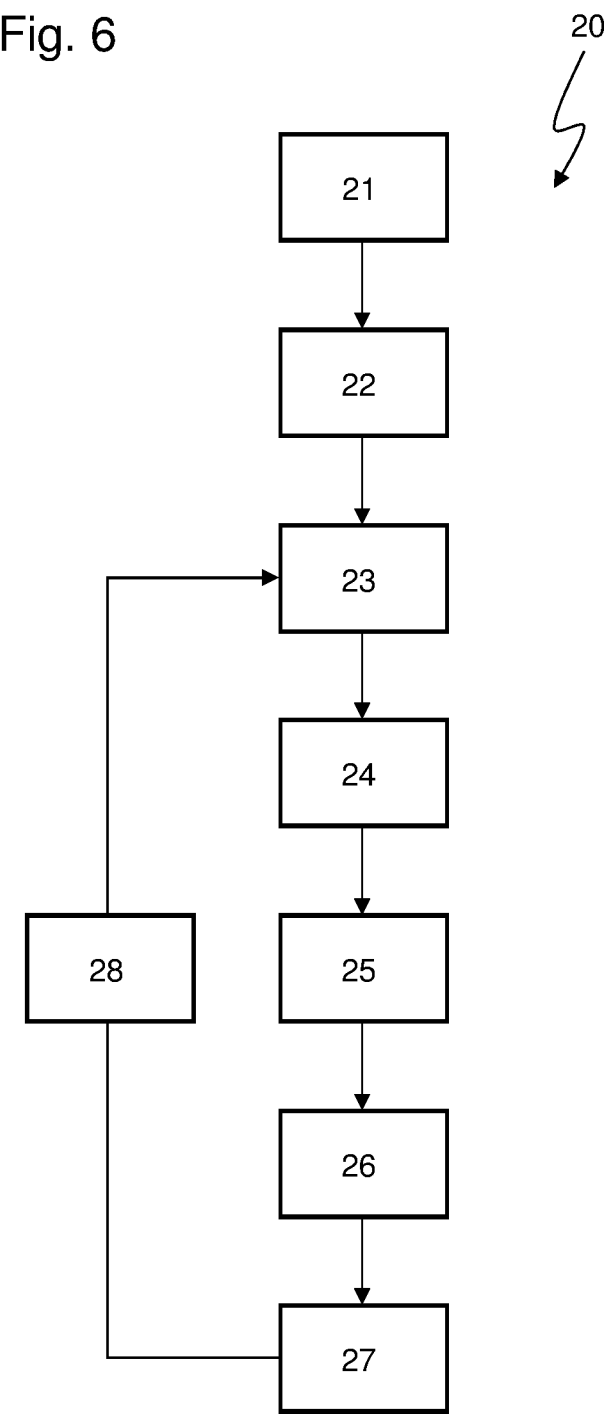

MEASURING PAVING LAYER THICKNESS BY MEANS OF A ROAD ROLLER

FIELD

The invention relates to a method for determining the thickness of the paved layer paved by a road paver by means of a self-propelled road roller. The invention further relates to a self-propelled road roller, in particular a tandem roller or a single-drum roller, for the compaction of a ground in a working direction and a roller system for paving a paved layer or for determining the thickness of the paved layer paved by a road paver.

BACKGROUND

The construction of roads and plazas as well as, for example, airport runways normally starts with a smoothing and compacting of the surface area to be paved. To the surface area thus prepared a road paver then applies the paving material to be paved by spreading it across its entire working width, smoothing it and precompacting it. The road paver is in most cases followed by one or more rollers, for example tandem rollers or single-drum rollers, which are used to further compact the layer paved by the road paver. During this process, the thickness of the paved layer continuously decreases until an optimum degree of compaction has been reached at which the finished road or plaza or runway has a maximum life span or service life. When constructing roads, plazas and runways, strict specifications regarding the required minimum layer thickness must typically be met. At the same time, the cost of the paving material, of which normally several tons are required, represents a decisive factor for the profitability of the corresponding construction project. It is thus necessary to meet the minimum requirements regarding the layer thickness as precisely as possible in order to avoid implementing unnecessary amounts of paving material.

It is, however, difficult to determine the actual layer thickness of the paved material after compaction. For example, until now, the thickness of the layer left behind by the road paver has been measured at the levelling cylinders of the paving screed of the road paver. However, this layer, which is merely precompacted, is compacted further by the road rollers that follow, so that the layer thickness decreases further. An exact determination of the actual thickness of the paved layer is thus not possible until the last roller has passed over it. Existing manual methods for determining the layer thickness are, however, complicated, time-consuming and expensive.

SUMMARY

The object of the present invention is thus to propose a solution for ascertaining or monitoring the thickness of the paved layer in a reliable, simple and cost-effective manner. In particular, the paved layer should be ascertained in its optimum compaction state at the end of the construction works. At the same time, it is intended to facilitate the adjustment of the thickness of the paved layer while the latter is still under construction in order to adhere as closely to the minimum requirements as possible.

Specifically, the object is achieved with a method for determining the thickness of the paved layer paved by a road paver by means of a self-propelled road roller, comprising the steps: establishing a height reference, creating a height profile—in particular a location-dependent height profile—of the surface area to be paved, paving the paved layer, measuring the elevation of a height reference sensor of a self-propelled road roller in relation to the height reference, in particular at different points above the paved layer, measuring the position of the height reference sensor in relation to the ground, ascertaining a height profile of the paved surface area, and ascertaining the thickness of the paved layer from the two height profiles. Moreover, it is also possible to determine the position of the height measurement point in relation to the position of the height reference sensor, for example in order to compensate for an inclination of the road roller on the underlying ground mathematically, as explained in greater detail below. The basic idea of the present invention is to ascertain the thickness of the paved layer from a difference between the absolute heights of the unpaved surface area and the paved surface area in relation to a height reference. For example, once the surface area to be paved has been prepared for paving with the paving material, its height relative to a height reference could be measured and stored. Although it would be generally sufficient to determine the height only at points, it is preferred to measure the height of the non-paved surface area across the surface area or continuously. This way, a height profile, in particular a three-dimensional height profile, of the surface area to be paved is created. Subsequently, once the layer of paving material has been applied to the ground to be paved, for example by a road paver, and once this layer has been compacted to the optimum degree of compaction, the measurement is repeated and the height of the surface of the paved layer in relation to the height reference is determined. In this manner, another height profile is created, this time of the paved surface area. The thickness of the layer paved by the road paver, to which the paved material has been compacted, can then be ascertained by a comparison of the two height profiles, for example by a difference obtained by subtracting the height profile of the unpaved surface area to be paved from the height profile of the paved surface area. It is particularly advantageous when the determination of the height profiles of the unpaved and the paved surface area is performed by the mobile working machines which traverse these surfaces anyway during the paving of the paving material. Thus, the height profile of the surface area to be paved can be measured, for example, by the ground compactors or road rollers that perform the compaction for the preparation of the surface. The road paver also travels over the unpaved surface yet to be paved and can thus also capture this height profile. The height profile of the paved surface, i.e. the surface of the paved layer, is preferably captured by the road rollers that compact the paved layer behind the road paver. This way, the ascertainment can occur during the last traversal of the paved layer by the road rollers so that the actual thickness of the layer left behind by the road rollers can be ascertained.

In principle, any height reference that is sufficiently accurate can be considered for the invention. For example, a height reference sensor can be used that measures its elevation in relation to sea level. However, as such systems exhibit deviations that depend on external factors, it is difficult to achieve the required accuracy. It is thus particularly preferred to use a local height reference system. For example, it is possible to implement a system that has multiple reference stations distributed along the surface to be paved and that measures the elevation of the height reference sensor in relation to these reference stations. The described height profiles can also be obtained by measuring the position in relation to these reference stations before and after the paving of the paved layer. The reference stations can then ascertain the exact spatial position of the height reference sensor, for example, in conjunction with a satellite-based positioning system (for example GPS) or by means of a triangulation method. Basically, it is preferred to use a system that is able to ascertain the three-dimensional position of the height reference sensor in relation to the reference stations. Such systems are generally known and thus not explained in greater detail here.

In order to be able to create the corresponding height profiles over an area as large as possible by means of such height reference sensors, the height reference sensor typically needs to be attached on the construction machines as far away from the ground as possible, i.e. as high as possible. What is actually measured then, however, is the position of the height reference sensor, which does not correspond to the height of the current contact surface of the construction machine on the ground to be paved or already paved. Another problem is the fact that the distance of the height reference sensor on the construction machine from the ground is not constant. When in operation, oscillations occur in the construction machines, for example as a result of the operation of vibrating roller drums or as a result of the chassis suspensions, so that the height reference sensor will swing up and down in relation to the ground or the contact surface of the construction machine in an irregular and unpredictable manner. Construction machines typically have a suspension with several centimeters of spring. An exact determination of the elevation of the height reference sensor in relation to the height reference, which would allow a determination of the layer thickness of the paved layer with an accuracy within just a few millimeters, is thus generally not possible if based solely on the elevation of the height reference sensor. It is also not possible to use, for example, filter algorithms capable of eliminating the oscillations of the elevation of the height reference sensor to a certain degree mathematically in order to achieve a sufficient degree of accuracy for the layer thickness measurement. A basic idea of the present invention is thus to determine the position of the height reference sensor in relation to the ground, for example by means of a distance sensor, in addition to the elevation of the height reference sensor in relation to the height reference. This way, the invention renders possible a high-precision error correction with respect to the oscillations or vibrations of the height reference sensor on the machine frame of the road roller. The position of the height reference sensor in relation to the ground is also determined either at points simultaneously with the measurement of the elevation of the height reference sensor or over the entire surface, i.e. continuously. The distance between the height reference sensor and the contact surface of the construction machine is thus preferably known at any point in time. This value can then be used to determine the elevation of the ground or the contact surface vis-à-vis the height reference together with the measured elevation of the height reference sensor in relation to the height reference. Although the distance of the height reference sensor from the ground or the contact surface of the construction machine varies with the suspension or with the vibration of the construction machine, it indicates the actual distance of the height reference sensor from the ground at any point in time. In accordance with the invention, by means of the measurement of the actual distance, the estimation of the error of the elevation of the height reference sensor caused by the oscillations or vibrations of the construction machine is no longer necessary, whereby the accuracy of the layer thickness determination is improved.

The invention renders possible the exact determination of the layer thickness of the paved layer with the final traversal of the road roller. As road construction is performed, e.g., continuously, this final traversal has been completed in one area of the road, while the road paver is still paving paving material in a distant section of the area to be paved. However, by means of the final measurement of the resulting layer thickness of the optimally compacted paved layer, feedback is now obtained regarding the extent to which the amount of paving material laid by the road paver is sufficient to meet the minimum requirements for the thickness of the layer, or regarding the extent to which too much paving material has been applied. It is thus preferred that the road paver adjusts the current paving thickness based on the thickness of the paved layer ascertained by the road roller. For example, the thickness values measured at the fully compacted layer are transmitted from the road roller to the road paver via a wireless connection so that the operator of the road paver can adjust the thickness of the layer that has been applied but not yet completely compacted. It is also conceivable that the asphalt paver automatically adjusts the layer thickness based on the measured thickness of the optimally compacted layer transmitted by the road roller. This way, an excessive use of paving material can be avoided, so that the entire process is conducted in a more economic and environmentally friendly manner. Moreover, a failure to meet the minimum requirements can also be avoided, so that subsequent corrections otherwise necessary are avoided. The continuous measurement of the resulting layer thickness and its feedback to the road paver facilitate a continuously operating system with optimum control of the work result during the paving process.

The object mentioned above is further achieved with a self-propelled road roller, in particular a tandem roller or a single-drum roller, for compacting a ground in a working direction, with a machine frame, a drive unit, and a control device, wherein a sensor device is provided for the detection of the thickness of a paved layer, wherein the sensor device comprises a height reference sensor and a distance sensor, wherein the height reference sensor is configured to determine its height position in relation to a height reference and the distance sensor is configured to determine the height position of the height reference sensor in relation to the ground, and wherein the control device is configured to ascertain the thickness of the paved layer from the measurements of the sensor device and a predetermined reference height. The road roller according to the invention carries out at least parts of the method described above. The control device is, for example, integrated into the on-board computer of the road roller and is equipped with corresponding software. It is, however, also possible that the control device is separate from the road roller, for example as a central control device or as a control device on another mobile work machine, for example another road roller or a road paver. The control device can also be connected to the road roller via the Internet and can be arranged at a completely different location, for example on a server. The sensor device of the self-propelled road roller can be used to ascertain the height profile of the surface to be paved as well as the height profile of the paved surface. The height profile of the surface to be paved, which includes the three-dimensional elevation of the surface of the surface area to be paved in relation to the height reference, is used as a predetermined reference height. The thickness of the paved layer is ascertained by the control device, for example, by calculating the difference between the two height profiles. With respect to a single point, this means, for example, that the control device subtracts the elevation of the unpaved surface area at this specific point in relation to the height reference from the elevation of that same point of the paved area in relation to the height reference, whereby the layer thickness of the paved layer at that point is obtained. By measuring the height profiles over the entire surface area or continuously, the layer thickness of the entire paved layer at each point can be ascertained.

As described above, the height reference sensor should be arranged on the road roller as far away from the ground as possible in order to be able to communicate with the height reference over a range that is as large as possible. For example, it is possible to arrange the height reference sensor on the machine frame, for example on the operator platform of the road roller. The distance of the height reference sensor from the ground can be determined particularly easily if the distance sensor is configured to determine the vertical distance between the height reference sensor and the ground. In other words, the distance sensor measures the distance between the height reference sensor and the contact surface of the road roller in the normal direction of the contact surface or the ground. In this embodiment, the distance sensor thus measures the shortest distance between the height reference sensor and the ground, so that this distance can also be used directly for calculating the actual distance between the elevation of the height reference sensor and the elevation of the ground.

In an alternative embodiment, it is also possible that the distance sensor is configured to determine the vertical distance between the height reference sensor and a roller drum of the road roller, in particular the apex of the roller drum facing away from the ground, the control device being configured to take the diameter of the roller drum into account when ascertaining the thickness of the paved layer. The apex of the roller drum facing away from the ground describes the highest point or the uppermost line on the circumferential surface of the roller drum. As the roller drum of the road roller exhibits only a very low degree of wear, the diameter of the roller drum can be considered practically constant. The resulting error caused is small enough that a new calibration of the distance sensor, for example, once a year is sufficient to avoid appreciable errors. Since the diameter of the roller drum can thus be considered to be known, it is possible to measure the distance of the height reference sensor from the upper apex of the roller drum and add the diameter of the roller drum to this measured distance in order to ascertain the distance of the height reference sensor from the ground or the contact surface of the road roller. The advantage of the measurement of the distance from the roller drum over a measurement of the distance from the ground lies in the fact that the distance sensor typically emits signals, for example ultrasonic or laser signals, that need to be reflected from the surface on which they are incident so that the distance sensor can evaluate the reflected signals and thus calculate the distance. The outer circumferential surface of the roller drum is typically smooth and has better reflection properties than the ground.

In principle, the distance sensor could be fixed to the road roller in a rotatable manner so that its measuring direction is always oriented towards the Earth's center, i.e. parallel to the force of gravity. This way, the distance of the height reference sensor from the ground can be determined correctly even if the road roller stands or travels on an inclined surface. However, as such a suspension of the distance sensor is in turn susceptible to errors caused by the vibrations of the road roller, it is alternatively preferred that an inclination sensor is provided which measures an inclination of the road roller in and/or transversely to the working direction, and that the control device is configured to take the inclination of the road roller into account when ascertaining the thickness of the paved layer. The distance sensor thus always measures the distance from the contact surface of the road roller in the normal direction. In order to compensate for the measurement error caused by an inclination of the ground, at least one inclination sensor is provided on the road roller which is configured to detect and quantitatively determine the deviation of the orientation of the road roller from a horizontal position. The current inclination of the road roller can then be used for a coordinate transformation from the measured elevation of the height reference sensor to the contact point of the road roller. This way, it is possible to create a correct height profile of the ground relative to the height reference even when the contact surface is uneven or inclined. The current transverse and longitudinal inclination of the road roller can be determined here to achieve optimum accuracy. With the help of the inclination information, it is possible to compensate for the resulting change in the height of the height reference sensor. With a road surface inclination of only 3% and an installation height of the height reference sensor of 3,000 mm (common operator platform roof height), the height reference sensor would be approx. 1 mm too low in relation to a horizontal reference plane. Moreover, the measuring point is shifted by 90 mm in the horizontal direction. The actual target height is thus 2.7 mm higher or lower because the height reference sensor is not located vertically over the measuring point but is shifted in accordance with the inclination and the installation height.

The local inclination of the surface can be determined either by means of a direct inclination measurement on the roller or using the topographic data previously generated by the road paver. The road paver frequently already detects transverse inclination data of the paving screed. The longitudinal inclination can be ascertained from the measurement data of a height reference sensor on the paver. According to a preferred embodiment, provision is thus made for the inclination of the height reference sensor or the road roller in and/or transversely to the working direction to be ascertained based on topographic data of the paved layer, and for the control device to be configured to take the inclination of the height reference sensor or the road roller into account when ascertaining the thickness of the paved layer. The topographic data of the paved layer are captured, for example, by the road paver or by means of an alternative system and are provided to the control device. If the roller has access to mapped inclination data from the road paver, the measurement of the road inclination with sensors on the road roller is not necessary.

As most sensor types are relatively sensitive and there is a risk of damage due to excessive shocks, the height reference sensor and/or the distance sensor are preferably arranged on the road roller in an oscillation-decoupled manner. As the distance sensor continuously determines the distance of the height reference sensor from the ground, measurement errors in the height profile of the ground caused by oscillations of the distance sensor and the height reference sensor can be excluded. Damage to the sensors can thus also be prevented by using a very soft suspension on the road roller.

In order to ensure that the distance sensor can always determine the distance of the height reference sensor from the ground correctly, the height reference sensor and the distance sensor are preferably arranged on the road roller so that the distance between the height reference sensor and the distance sensor is always the same. For example, it is preferred that the height reference sensor and the distance sensor are rigidly connected to each other so that the distance between the two sensors will not change even when the road roller is vibrating heavily. This way, the constant distance between the sensors can be used in the calculation of the distance of the height reference sensor from the ground. In an alternative embodiment, the height reference sensor and the distance sensor are arranged on the road roller so that the distance of the height reference sensor and the distance sensor from the ground is the same. This way, the measured distance of the distance sensor from the ground can be used directly as the distance of the height reference sensor from the ground.

It is further particularly preferred that the height reference sensor and the distance sensor are arranged on the road roller as a single assembly unit and are rigidly connected with each other. This way, the distance between the two sensors is always the same so that the distance of the height reference sensor from the contact surface of the road roller can be ascertained in a reliable and simple manner. Moreover, the installation of the height reference sensor and the distance sensor as a single assembly unit is particularly simple and also suitable as a retrofit kit for existing machines. The height reference sensor and the distance sensor thus form a single module, for example with a common housing, which can be installed on the road roller as a single unit. It is thus not necessary to install the height reference sensor and the distance sensor separately and then, additionally, to calibrate the distance between the sensors in order for the determination of the distance of the height reference sensor from the ground by means of the distance sensor to work.

Generally, any available technology can be used for the height reference sensor and the distance sensor. For example, the height reference sensor can be an autonomous sensor which ascertains the absolute height of the road roller, for example, in relation to sea level. The distance sensor can be designed, for example, as an ultrasonic sensor or a radar sensor, in particular as a radar sensor with a small wavelength. Small wavelengths here refer to wavelengths in the millimeter range, by means of which the distances can be measured with the required accuracy. It is, however, particularly preferred to design the height reference sensor as a laser height sensor and/or the distance sensor as a laser distance sensor, which are particularly reliable. The height reference can be implemented by using, for example, laser transceivers known in the prior art as reference stations or base stations for the triangulation in a manner known per se. A roller system for determining the thickness of the paved layer paved by a road paver in accordance with the invention thus comprises, for example, a self-propelled road roller as described herein and at least one stationary height reference station separate from the self-propelled road roller, which is designed, for example, as a laser transceiver. Such a roller system is also suitable for realizing the aforementioned object.

The measured height profiles are preferably stored by the control device so that they can also be read out and/or evaluated at a later time. Moreover, the operator of the road roller preferably receives direct feedback regarding the layer thickness and/or the height profiles of the ground during work. The control device is thus preferably configured to create a three-dimensional topography of the thickness of the paved layer, and preferably comprises a display device configured to display the captured topography to the operator of the road roller. In other words, the control device creates a three-dimensional image of the measured height profiles and displays the same to the operator as a modeled three-dimensional representation. This way, the operator has direct control over the layer thickness in different sections of the work area and can monitor its development during operation.

The invention, however, goes beyond a mere passive observation of the work result. As the road roller is configured to ascertain the thickness of the paved layer continuously during operation, it is possible to adjust the working operation based on the ascertained information, for example, by varying the thickness of the layer paved by the road paver. In this respect, a transmission unit for wireless communication is preferably provided on the self-propelled road roller, and the control unit is preferably configured to transmit the ascertained thickness of the paved layer via the transmission unit to a road paver. The transmission can occur either directly from the road roller to the road paver or indirectly via a base station. It is simply important that the road roller forwards the layer thickness of the paved layer ascertained to the further construction machines on the construction site, and in particular to the road paver.

The road paver is in turn configured to receive the thickness of the paved layer transmitted by the road roller and to adjust the current paving thickness of the paved layer based on these data. The road paver can thus apply more or less material to the surface area to be paved depending on whether the layer thickness determined by the road roller falls short of or exceeds the minimum requirement with regard to the thickness of the paved layer. The road paver is then either configured to indicate the layer thickness ascertained by the road roller to an operator, or the road paver is configured to adjust the amount of paving material applied per surface area automatically based on the layer thickness data. A roller system for paving a paved layer in accordance with the invention with which it is also possible to realize the aforementioned object comprises at least one road roller and a corresponding road paver as described above.

All features described above and in the following description of the figures, as well as the effects and advantages of the method according to the invention, of the self-propelled road roller according to the invention and of the roller systems according to the invention respectively also apply mutatis mutandis to the method, the road roller and the roller systems even if they are cited explicitly only in connection with one of these respective aspects in order to avoid repetition. In particular, the method also comprises all processes described in connection with the devices, and the devices are configured to carry out the method.

BRIEF DESCRIPTION OF THE DRAWINGS

The invention is explained in greater detail in the following with the help of the examples shown in the figures, which show schematically:

FIG. 1 is a side view of a tandem roller;
FIG. 2 is a side view of a single-drum roller;
FIG. 6: is a flow chart of the method.

DETAILED DESCRIPTION

Figure 3:
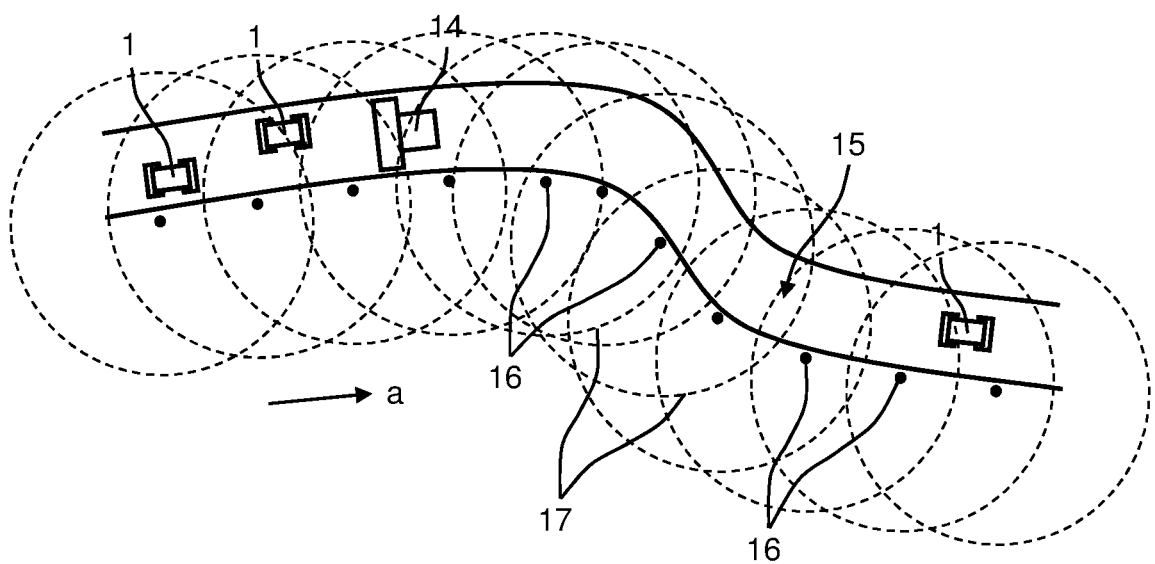
FIG. 3 is the structure of a height reference system along a surface area to be processed.

Identical elements or elements with identical functions are designated by identical reference numbers. Recurring parts are not designated separately in each figure.

FIGS. 1 and 2 show road rollers 1, more specifically a tandem roller in FIG. 1 and a single-drum roller in FIG. 2. The road rollers 1 include an operator platform 2 and a machine frame 3. They further comprise a drive unit 4, which is usually designed as a diesel engine. The tandem roller of FIG. 1 comprises two roller drums 5, which are both connected to the machine frame 3 via a drum mount 6. The single-drum roller of FIG. 2 comprises a roller drum 5 and a wheel 7. In working operation, the road rollers 1 move in or contrary to the working direction a over the ground 8, which they compact with their roller drums 5.

The road rollers 1 include a sensor device 9 comprising a height reference sensor 10 and a distance sensor 11. The height reference sensor 10 is configured to ascertain its elevation in relation to a height reference. For example, the height reference sensor 10 ascertains its position in relation to a height reference station, as described in greater detail below. The distance sensor 11 is configured to determine the distance A from the ground 8. Since the height reference sensor 10 and the distance sensor 11 are both arranged at the same height on the operator platform 2 of the road roller 1, the distance A from the ground 8 measured by the distance sensor 11 equals the distance of the height reference sensor 10 from the ground 8. In FIG. 1, an alternative arrangement of the sensor device 9 is suggested by dashed lines, according to which the sensor device 9 is arranged vertically above the roller drum 5. In this embodiment, the distance sensor 11 determines the distance B from the upper apex of the roller drum 5. This measured distance B then needs to be added to the diameter C of the roller drum 5 to ascertain the total distance of the distance sensor 11, and thus of the height reference sensor 10, from the ground 8. An inclination sensor 18 is provided to compensate for the elevation of the height reference sensor 10 in relation to the height reference when the ground 8 is inclined. The inclination sensor 18 is configured to detect a longitudinal and/or transverse inclination of the road roller 1 as well as to determine the degree of the latter.

Moreover, the road rollers 1 according to FIGS. 1 and 2 also include a control device 12 which is connected to the sensor device 9 and the inclination sensor 18 and records and stores their measurement results. The control device 12 is, for example, integrated into the on-board computer of the road rollers 1 and includes software enabling the control unit 12 to carry out the described method. For example, the control device 12 calculates the distance of the sensor device 9 from the ground 8 and takes it into account when calculating the elevation of the height reference sensor 10 compared to the height reference. The control device 12 further also uses the inclination of the road roller 1 measured by the inclination sensor 18 to determine the elevation of the height reference sensor 10 reliably and independently of deviations of the progression of the ground 8 from the horizontal. All in all, the control device 12 is thus adapted to create a height profile of the ground 8 based on the measured values of the sensor device 9 and the inclination sensor 18. The control device 12 calculates the layer thickness of the paved layer from a height profile of the ground 8 recorded prior to the paving of the paved layer and a height profile of the surface area including the paved layer. The control device 12 can also be connected to a display device 13 on which the control device 12 displays a three-dimensional topography of the determined elevations to the operator of the road roller 1. The road rollers 1 finally also include a transmission unit 19 via which the control device 12 transmits the ascertained thickness of the paved layer via a wireless connection to further construction machines on the same construction site, for example to a road paver.

FIG. 3 shows the structure of a height reference system. Specifically, FIG. 3 shows a planned road pathway 15 on which an asphalt layer is paved by a road paver 14. The road paver 14 travels along the road pathway 15 in the working direction a and distributes paving material, for example asphalt, across its entire width. A road roller 1 travels along the road pathway 15 ahead of the road paver 14 and compacts the ground 8 so as to prepare it for the application of the paved layer by the road paver 14. Further road rollers 1, which follow behind the road paver 14, traverse the paved layer distributed by the road paver 14 and compact it to an optimum degree of compaction. A plurality of height reference stations 16, which are designed, for example, as laser transceivers, is arranged along the road pathway 15. The height reference stations 16 form a height reference, which is per se known in the prior art, for the height reference sensors 10 arranged on the road rollers 1 and, if applicable, also on the road paver 14. To this end, the height reference stations 16 emit, for example, laser signals which facilitate a determination of both the horizontal distance of the road rollers 1 or the road paver 14 from the height reference stations 16 as well as the elevation of the road rollers 1 or the road paver 14 in relation to the height reference stations 16. Since the signals of the height reference stations 16 only have a limited range, which is suggested by the height reference radius 17 in FIG. 3, multiple height reference stations 16 are distributed along the road pathway 15, so that the road rollers 1 and also the road paver 14 can determine their vertical height in relation to the height reference stations 16 and their horizontal position with respect to these stations over the entire surface area of the road pathway 15. As an alternative to the determination of the horizontal distance from the height reference stations 16, the road rollers 1 and/or the road paver 14 can also determine their position in a satellite-supported manner, for example via GPS, while the height reference stations 16 are used merely for determining the vertical height or elevation compared to the height reference stations 16. The use and positioning of such height reference stations 16 is known in the prior art and is thus not explained in further detail here.

Figure 4:
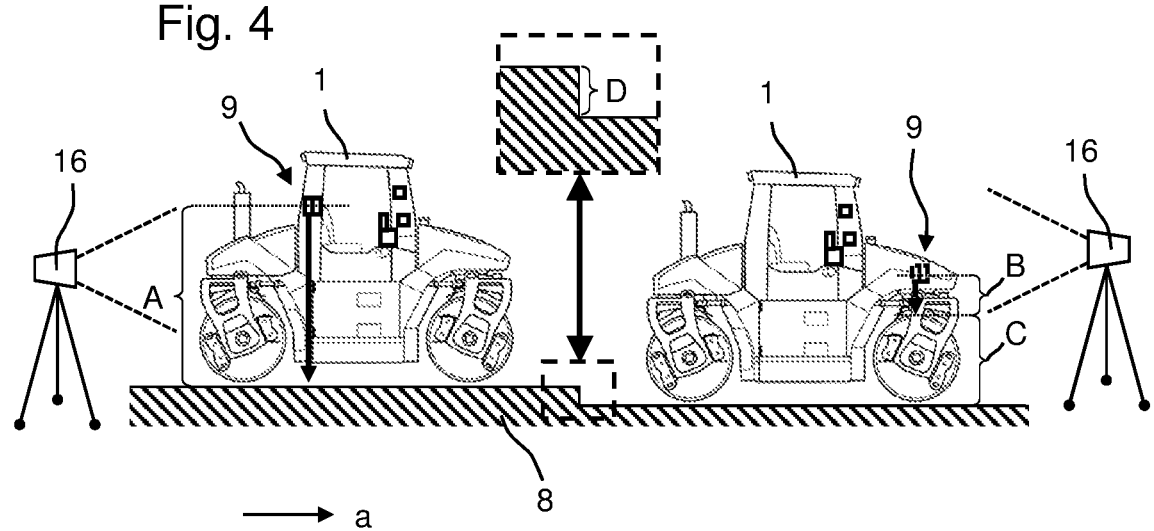
FIG. 4 is the creation of the height profiles before and after the paving of the paved layer by means of a road roller.

FIG. 4 shows the measurement or ascertainment of the height profiles of the surface area to be paved and the surface area already covered with a paved layer, respectively, by a road roller 1. The right-hand side of FIG. 4 shows a road roller 1 on the road pathway 15 before the paved layer has been paved by the road paver 14. The road roller 1 traverses this area in order to prepare the ground 8 for the paving of the paved layer. The ground is thus compacted so that the relative height of the ground compared to the height reference station 16 changes. With the last passage of the road roller 1, the ground 8 has reached its final height, so that the road roller 1 can survey the height of the ground 8 prior to the paving of the paved layer at this point. The road roller 1 is located within the height reference radius 17 of the height reference station 16 on the right-hand side of the figure. The road roller 1 and the height reference station 16 together form a roller system. In the example shown, the height reference system uses height reference stations 16, which emit a laser signal in a cone-shaped area and detect the height reference sensor 10 within this area. In a manner known in the prior art, the height reference station 16 is capable of detecting both the height of the height reference sensor 10 in relation to the height reference station 16 and the horizontal distance of the height reference sensor 10 on the road roller 1 from the height reference station 16. Via a triangulation method, the spatial position of the road roller 1, i.e. the height reference sensor 10, is thus known in relation to the height reference station 16. As also shown in FIG. 4, the road roller 1 on the unpaved surface area of the ground 8 shown on the right-hand side in said figure includes a distance sensor 11 which measures the distance B from the upper apex of the roller drum 5 of the road roller 1. From this distance, the distance of the height reference sensor 10 from the ground 8 is calculated by adding the drum diameter C. The elevation of the height reference sensor 10 and its distance from the ground 8 can in turn be used to calculate the elevation of the ground 8 at the point at which the road roller 1 is located. Based on a continuous measurement of this elevation, a three-dimensional height profile of the ground 8 over the entire surface area is created.

The left-hand side of FIG. 4 shows a road roller 1 for which the height of the height reference sensor 10 in relation to the height reference station 16 is likewise detected. It is also provided with a distance sensor 11 that measures the distance A of the height reference sensor 10 from the ground 8. Analogous to the description of the road roller 1 on the right-hand side of FIG. 4, a height profile of the ground 8 is also created in this case, during the final traversal of the road roller 1, during which the ground 8 is compacted to an optimum degree and there is virtually no further change in the thickness D of the paved layer. However, on the left-hand side of FIG. 4, the road paver 14 has already paved the paved layer of the road surface. The height of the paved surface shown on the left thus differs from the unpaved surface area shown on the right exactly by the thickness D of the paved layer, as suggested in FIG. 4. The thickness D of the paved layer can be ascertained from a comparison of the height relative to the height reference station 16 measured at a position on the ground 8 prior to the paving of the paved layer with the height relative to the height reference station 16 measured at the same position on the ground 8 after the paving of the paved layer. This is done by subtracting the height of the ground 8 prior to the paving of the paved layer from the height of the ground 8 after the paving of the paved layer. By means of the creation of the three-dimensional height profiles prior to and after paving, these can also be subtracted directly, so that a three-dimensional image or a topography of the paved layer with its layer thickness D is obtained at each individual point. Errors caused by the vibration of the road roller 1 or its suspension during operation are compensated by the direct measurement of the distance from the ground 8 by the distance sensor 11.

Figure 5:
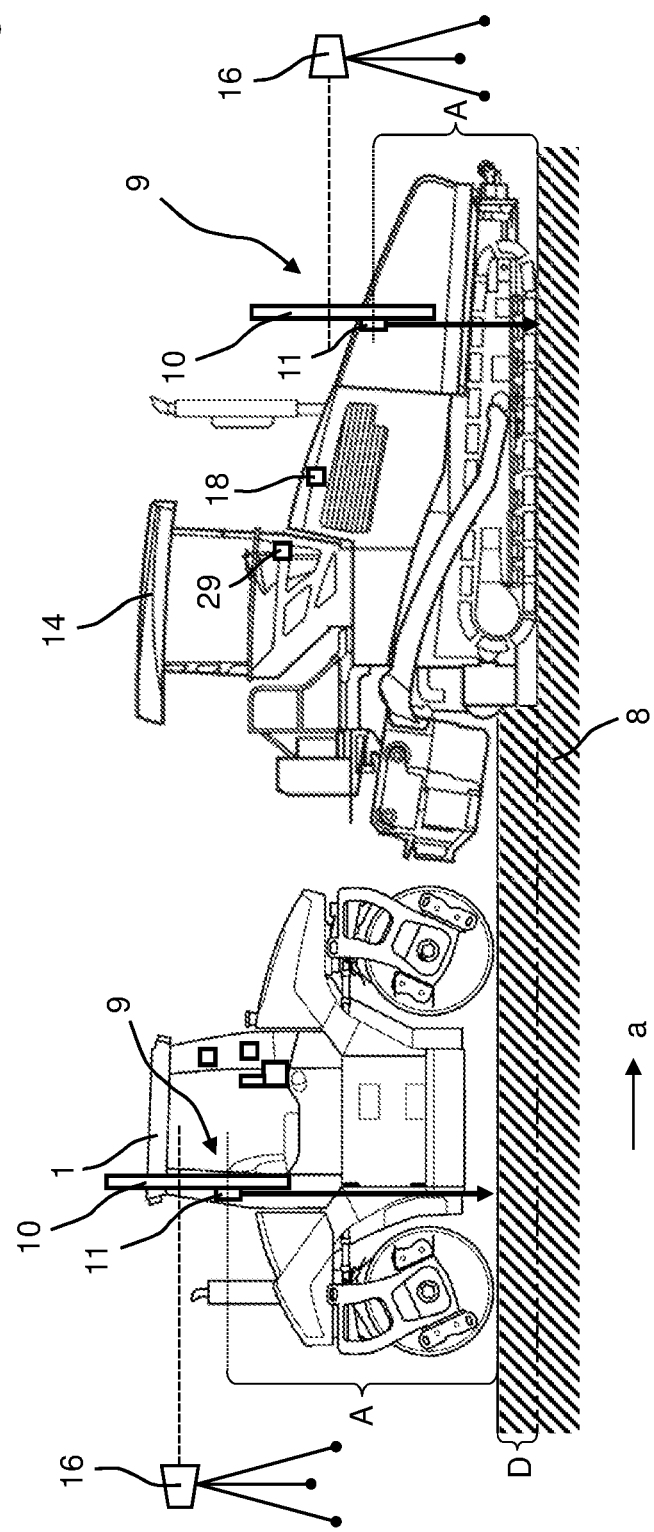
FIG. 5 is the creation of the height profiles before and after the paving of the paved layer by means of a road roller and a road paver.

FIG. 5 also shows the measurement or ascertainment of the height profiles of the paved and unpaved surface area. However, in contrast to FIG. 4, this step is effected by a road paver 14 and a road roller 1. The road paver 14 travels on the surface of the ground 8 prepared by the road rollers 1 and paves the paved layer. The road paver 14 can thus measure or detect the height profile of the unpaved surface in the manner described above. To this end, the road paver 14 comprises a sensor device 9, as described above. In the example shown, the sensor device 9, and in particular the height reference sensor 10, is configured for use with height reference stations 16 which do not cover a three-dimensional cone with their laser signals, but rather a plane and which detect the height reference sensor 10 within said plane. In order to compensate for height differences, the height reference sensor 10 is thus configured as a vertical rod over the longitudinal direction of which the laser plane created by the height reference station 16 is detected, as already known per se in the prior art. This height reference system can also be used to determine the spatial position of the road paver 14 and also the road roller 1 by means of a triangulation method. The sensor device 9 according to FIG. 5 otherwise corresponds to the previous sensor devices 9, in particular with respect to the determination of the distance A from the ground 8 by means of the distance sensor 11. The road paver 14 thus creates the three-dimensional height profile of the unpaved surface area immediately before it paves the paved layer. The three-dimensional height profile of the paved surface area in the optimum compaction state is in turn measured by a road roller 1 following the road paver 14. As already described above, the thickness D of the paved layer is ascertained by calculating the difference between the two height profiles. In this manner, the layer thickness D is known at each point of the paved surface area.

The invention thus in particular enables a feedback regarding the layer thickness D determined by the road roller 1 to the road paver 14. To this end, the road paver 14 includes a receiver unit 29 with which it can receive the layer thickness D ascertained by the road roller 1 via a wireless connection. Alternatively, the road paver 14 can also receive the measured raw data and perform the evaluation itself. The road paver 14 can adjust the amount of paving material applied per surface area unit depending on whether the determined layer thickness D falls short of or exceeds the minimum requirements with regard to the layer thickness. This makes it possible to avoid the application of unnecessary amounts of paving material to the surface area to be paved so that the entire paving process is performed in a more economic and environmentally friendly manner. By means of the compensation of the measurement errors caused by the vibrations or oscillations of the machines by the continuous measurement of the distance of the height reference sensor 10 from the ground 8 by the distance sensor 11, the invention facilitates a very precise measurement of the layer thickness D with a minimum measurement error in the millimeter range.

FIG. 6 shows the sequence of the method 20. The method 20 starts in step 21 with the establishing of a height reference, i.e., for example, installing the height reference stations 16 along the surface to be paved, for example along the road pathway 15. Ways of implementing such a height reference using laser transceivers are known in the prior art and thus not explained in more detail. In step 22, a height profile of the surface area to be paved is created after its preparation for the paving process. The height profile of the surface to be paved acts as a zero position or zero surface, so that a height exceeding this height profile can be identified as a layer thickness D of the paved layer. As described above, the height profile of the surface area to be paved can be ascertained either by a road roller 1 during its final traversal of the ground to be prepared or alternatively by the road paver 14 immediately prior to the paving of the paved layer. In step 13 of the method 20, the paved layer is paved. The road paver 14 travels along the surface area to be paved and covers it with a smoothed and precompacted paved layer, for example asphalt. This layer is then compacted by the road rollers 1 until an optimum degree of compaction has been reached. In step 24, the elevation of a height reference sensor 10 of a self-propelled road roller 1 with respect to the height reference is measured during the final traversal of the paved layer by the road roller 1. During this process, in step 25, the position of the height reference sensor 10 in relation to the ground 8 is also constantly ascertained, which facilitates an error compensation for oscillations and vibrations of the road roller 1. The measurement of the elevation of the height reference sensor 10 and its position in relation to the ground is performed for the entire surface area of the paved layer, so that the height profile of the paved surface area, which differs from the height profile of the unpaved surface area by the thickness D of the paved layer, can be created as a whole in step 26. In step 27, the thickness D of the paved layer can then be ascertained from the two height profiles with an accuracy in the millimeter range. In step 28, the road paver 14 can then adjust the current paving thickness, i.e. the amount of paving material applied by the road paver 14 per surface area unit, using the information about the layer thickness D. In this manner, the invention enables a particularly economic paving process.

What is claimed is:

1. A self-propelled road roller, comprising:
   a machine frame;
   a drive unit; and
   a control device;
   wherein the self-propelled road roller comprises a tandem roller or a single-drum roller, to compact ground in a working direction; and
   wherein a sensor device for determining thickness of a paved layer is provided, the sensor device comprising a height reference sensor and a distance sensor, the height reference sensor being configured to determine its height position in relation to a height reference, and the distance sensor being configured to determine the height position of the height reference sensor in relation to the ground; and
   wherein the control device is configured to ascertain the thickness of the paved layer from measurements of the sensor device and a predetermined reference height.

2. The self-propelled road roller according to claim 1, wherein the distance sensor is configured to determine vertical distance between the height reference sensor and the ground.

3. The self-propelled road roller according to claim 1, wherein the distance sensor is configured to determine vertical distance between the height reference sensor and a roller drum of the road roller, an apex of the roller drum facing away from the ground, the control device being configured to take a diameter of the roller drum into account when ascertaining the thickness of the paved layer.

4. The self-propelled road roller according to claim 1, wherein an inclination sensor is provided which measures an inclination of the road roller in and/or transversely to the working direction, and that the control device is configured to take the inclination of the road roller into account when ascertaining the thickness of the paved layer.

5. The self-propelled road roller according to claim 1, wherein an inclination of the height reference sensor in and/or transversely to the working direction is ascertained based on topographic data of the paved layer, and that the control device is configured to take the inclination of the height reference sensor into account when ascertaining the thickness of the paved layer.

6. The self-propelled road roller according to claim 1, wherein the height reference sensor and/or the distance sensor is/are arranged on the road roller in an oscillation-decoupled manner.

7. The self-propelled road roller according to claim 1, wherein the height reference sensor and the distance sensor are arranged on the road roller in such a manner that the distance of the height reference sensor and of the distance sensor from the ground is the same.

8. The self-propelled road roller according to claim 1, wherein the height reference sensor and the distance sensor are arranged on the road roller as a single assembly unit and are rigidly connected with each other.

9. The self-propelled road roller according to claim 1, wherein the height reference sensor comprises a laser height sensor and/or the distance sensor comprises a laser distance sensor.

10. The self-propelled road roller according to claim 1, wherein the control device is configured to create a three-dimensional topography of the thickness of the paved layer, and further comprises a display device configured to display the created topography to an operator of the road roller.

11. The self-propelled road roller according to claim 1, wherein a transmission unit for wireless communication is provided, and that the control unit is configured to transmit the ascertained thickness of the paved layer via said transmission unit to a road paver.

12. A roller system for paving a paved layer, comprising a self-propelled road roller according to claim 11 and a road paver, wherein the road paver is configured to receive the thickness of the paved layer transmitted from the road roller and to adjust the current paving thickness of the paved layer based on the thickness of the paved layer transmitted from the road roller.

13. A roller system for determining the thickness of the paved layer paved by a road paver, comprising a self-propelled road roller according to claim 1 and at least one stationary height reference station separate from the self-propelled road roller.

* * * * *